United States Patent [19]
Watson et al.

[11] Patent Number: 6,071,407
[45] Date of Patent: Jun. 6, 2000

[54] MAGNETIC SEPARATION

[75] Inventors: James Henry Peter Watson, Bassett; Derek Clifford Ellwood, Cumbria, both of United Kingdom

[73] Assignee: University of Southampton, Southampton, United Kingdom

[21] Appl. No.: 09/029,155
[22] PCT Filed: Aug. 15, 1996
[86] PCT No.: PCT/GB96/01993
  § 371 Date: May 26, 1998
  § 102(e) Date: May 26, 1998
[87] PCT Pub. No.: WO97/07064
  PCT Pub. Date: Feb. 27, 1997

[30] Foreign Application Priority Data

Aug. 16, 1995 [GB] United Kingdom .................. 9516753

[51] Int. Cl.[7] .................. C02F 3/00; C02F 3/34; B03C 1/00
[52] U.S. Cl. .................. 210/615; 210/626; 210/695; 210/739; 210/765; 210/195.1; 210/195.3; 210/197; 210/198.1; 210/202; 210/218; 210/222; 210/223
[58] Field of Search .................. 210/615, 601, 210/603, 611, 614, 621, 623, 624, 631, 695, 739, 765, 766, 175, 180, 195.1, 197, 195.3, 202, 218, 222, 223

[56] References Cited

U.S. PATENT DOCUMENTS 3,351,203  11/1967  Robb .
4,354,937  10/1982  Hallberg .
4,372,856   2/1983  Morrison ......................... 210/603
4,476,027  10/1984  Fox ................................. 210/695
4,508,625   4/1985  Graham .
4,735,725   4/1988  Reischl et al. .
5,228,995   7/1993  Stover .
5,328,594   7/1994  Hettinger .

FOREIGN PATENT DOCUMENTS 41 30 424 A1   3/1993  Germany .
63-151400      6/1988  Japan .
02095496       6/1990  Japan .

*Primary Examiner*—David A. Reifsnyder
*Attorney, Agent, or Firm*—Renner, Otto, Boisselle & Sklar, LLP

[57] ABSTRACT

A method of generating an adsorbent product for use in magnetic separation of contaminants from an influent liquid comprises the steps of: (i) mixing at least one micro-organism with the liquid in a chemostat vessel; (ii) magnetically separating a magnetic fraction of liquid from the vessel from a non-magnetic fraction (iii) returning the magnetic fraction to the vessel; and (iv) collecting precipitated material from the vessel for use as the adsorbent product. In an embodiment, a solution comprising heavy metals is fed to a chemostat containing sulphur-generating micro-organisms, iron, sulphates and a nutrient compound together with $N_2$. Liquid is drawn off to a high gradient magnetic separator where the non-magnetic fraction containing decontaminated liquid is separated off; the slurry is removed for use as an adsorbent. Sulphide generating micro-organisms are listed. Dy and Er salts or complexes can be added, as can other specified micro-organisms.

8 Claims, 3 Drawing Sheets

MAGNETIC SEPARATION

This invention relates to magnetic separation.

Magnetic separation is a technique used to remove contaminants such as heavy metal ions from solution in, for example, water.

One example of the use of magnetic separation is to remove radioactive heavy metal contaminants from waste water generated in a nuclear plant. The technique involves adding an adsorbent material to the contaminated solution which attaches to the contaminants, for example by chemical or electrostatic adsorption. The adsorbent material has magnetic properties so that, after the adsorbent material has removed heavy metals and/or organic materials from solution, the loaded adsorbent can be removed magnetically. (However, other separation techniques such as microfiltration, high speed centrifuge, hydroclone or flotation could be used).

A complementary process to the above technique is the so-called biomagnetic separation process. The basis of previously proposed biomagnetic separation techniques is that low-level micro-organisms are grown and then introduced into the contaminated solution. The micro-organisms have the two important properties mentioned above: they interact with the contaminants in the solution (generally by precipitation or adsorption on the organism surface) and they have magnetic properties so that they can subsequently be separated from the solution using a magnetic technique such as high gradient magnetic separation (HGMS). When the micro-organisms are separated from the solution in this way, they carry with them the precipitated contaminants, and so the contaminants are removed from the solution.

This process is described in various publications such as the article "Biomagnetic Separation And Extraction Process For Heavy Metals From Solution", Watson & Ellwood, Minerals Engineering, Vol. 7, No. 8, pp1017–1028 (1994), and "A Biomagnetic Separation Process For The Removal Of Heavy Ions From Solution", Watson & Ellwood, Proceedings of the International Conference on Control of Environmental Problems from Metal Mines, 1988.

FIG. 1 is a schematic diagram of such a previously proposed biomagnetic separation apparatus, comprising a chemostat 10 in which the micro-organisms (in this example, the so-called "Desulfovibrio" micro-organism) are grown.

The Desulfovibrio micro-organisms are then supplied to a reaction vessel 20 in which they are mixed (using a stirrer 30) with contaminated effluent and solutions of sulphates ($SO_4$) and lactates. In the reaction vessel 20 the heavy metal contaminants in the effluent precipitate onto the surface of the Desulfovibrio micro-organisms.

The mixture is then passed to a high gradient magnetic separator 40 which (as described in the published references listed above) comprises a matrix of fine ferromagnetic wire which is magnetised by an externally-applied magnetic field (not shown). The paramagnetic Desulfovibrio bacteria (with precipitated contaminants) are attracted and held onto the wires by magnetic forces. The decontaminated effluent then emerges through an outlet 50.

From time to time, the material accumulated on the matrix can be removed by switching off the applied magnetic field and washing the particles from the matrix. Alternatively, the matrix can simply be withdrawn from the magnetic field for washing. Thus, HGMS is a cyclical process with a collection phase and a washing phase.

In the schematic diagram of FIG. 1, the Desulfovibrio bacteria with the heavy metal contaminants emerge through a separate washing outlet 60 during the washing of the matrix.

A problem with these previous magnetic separation processes is the difficulty in identifying suitable micro-organisms (from a large number of available micro-organisms) or other materials to interact with the contaminants in the particular effluent to be treated and produce a strongly magnetic precipitate.

This invention provides apparatus for generating an adsorbent product for use in magnetic separation of contaminants from an influent liquid, the apparatus comprising:

a chemostat vessel for growing the micro-organisms and for mixing the micro-organisms with the contaminated influent liquid;

a magnetic separator for receiving liquid from the chemostat vessel and for separating a magnetic fraction of the liquid from a non-magnetic fraction, the magnetic fraction being returned from the magnetic separator to the chemostat vessel;

characterised by means for detecting the rate of hydrogen sulphide production within the chemostat vessel; and means for adding iron to the chemostat vessel in amounts dependent on the rate of hydrogen sulphide production.

This invention also provides a method of generating an adsorbent product for use in bio-magnetic separation of contaminants from an influent liquid, the method comprising the steps of:

(i) mixing two or more types of micro-organism with the contaminated influent liquid in a chemostat vessel;

(ii) magnetically separating a magnetic fraction of liquid from the chemostat vessel from a non-magnetic fraction;

(iii) returning the magnetic fraction to the chemostat vessel; and (iv) collecting precipitated material from the chemostat vessel for use as the adsorbent product.

The invention recognises that the problem of selecting suitable micro-organisms for use in treating a particular contaminated liquid can be solved by growing a "cocktail" of a number of different micro-organisms in a chemostat, and then using a magnetic feedback process to isolate those which interact with the contaminants to give a magnetically separable product.

At the same time, undesired micro-organisms from the cocktail (i.e. those which do not interact with the contaminants to give a magnetic product) can be diverted away from the chemostat, to avoid interference with the remainder of the magnetic separation process. This can dramatically improve the success, and therefore the economic viability, of the magnetic separation process.

The operator does not need to worry about which micro-organisms of the cocktail are promoted by the feedback process, and which are discarded. This is because the selection is made on the basis of the desired properties of the micro-organisms, so those micro-organisms which are promoted in the feedback chemostat are those which are useful in the separation process for that (or those) contaminant(s) in the current liquid to be treated. However, if the micro-organisms which are promoted by the feedback process using a sample of effluent are analysed and identified, a similar mixture of micro-organisms could then be sold commercially as a medium for treating that effluent.

The skilled man will appreciate that the magnetic separation of the magnetic fraction from the non-magnetic fraction need not be 100% efficient. The intention is that magnetic fraction tends to be returned to the vessel in preference to the non-magnetic fraction.

The advantage described above relates to the selection of suitable micro-organisms. However, the method and apparatus of at least embodiments of the invention take matters one stage further, by recognising that the magnetic product generated in the feedback chemostat is itself an adsorbent of the contaminants in the liquid to be treated.

In embodiments of the invention, the magnetic feedback chemostat is first used with a selection of micro-organisms. Those which give favourable results, by combining with the contaminant(s) to give a magnetic product, are recycled into the chemostat, while those which do not are discarded. The magnetic product which is returned to the chemostat forms a slurry at the bottom of the chemostat. This slurry tends to be formed of micro-organisms (which may well be dead by this stage) on which, for example, sulphur products of iron and sulphur products of the contaminants are precipitated. These (generally dead) precipitated micro-organisms are themselves useful as adsorbents of the contaminants, as is the material precipitated on the micro-organisms, even if it becomes detached from the micro-organisms. Accordingly, the slurry (adsorbent material) which collects at the bottom of the feedback chemostat can be removed and used in the magnetic treatment of further contaminated liquid in a mixing vessel after which the contaminant-loaded adsorbent can be removed magnetically.

However, in other embodiments of the invention, if it is known that a particular micro-organism is suitable for use with the current contaminant(s), the techniques described above could still be employed to produce the adsorbent product from that micro-organism.

Preferably the chemostat vessel comprises an interior vessel supported within a temperature controlled water bath.

In the method, preferably steps (ii) and (iii) are performed cyclically a plurality of times.

An embodiment of the invention will now be described, by way of example only, with reference to the accompanying drawings, throughout which like parts are referred to by like references, and in which.

Figure 1:
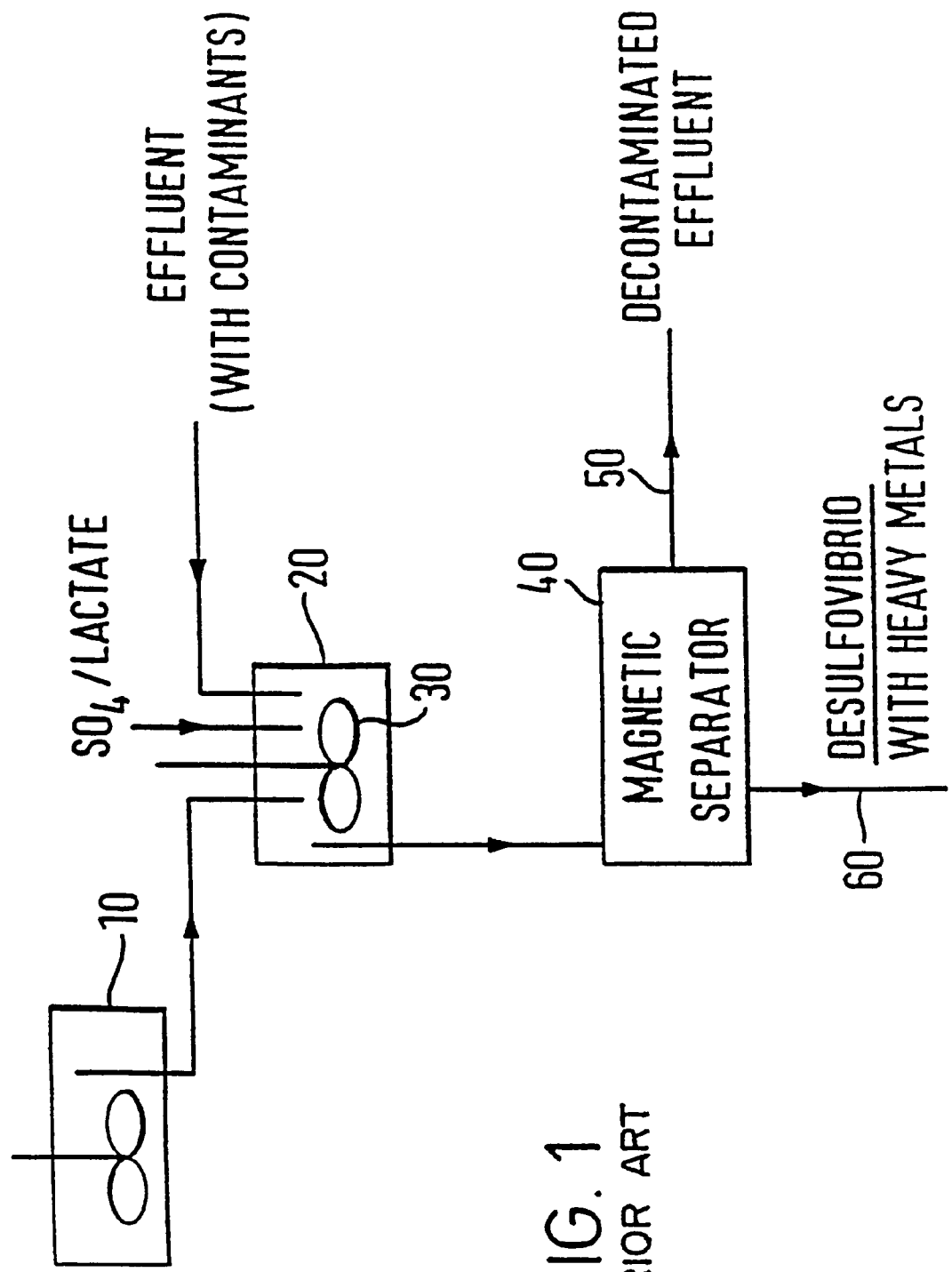
FIG. 1 is a schematic diagram of a previously proposed biomagnetic separation apparatus.
Figure 2:
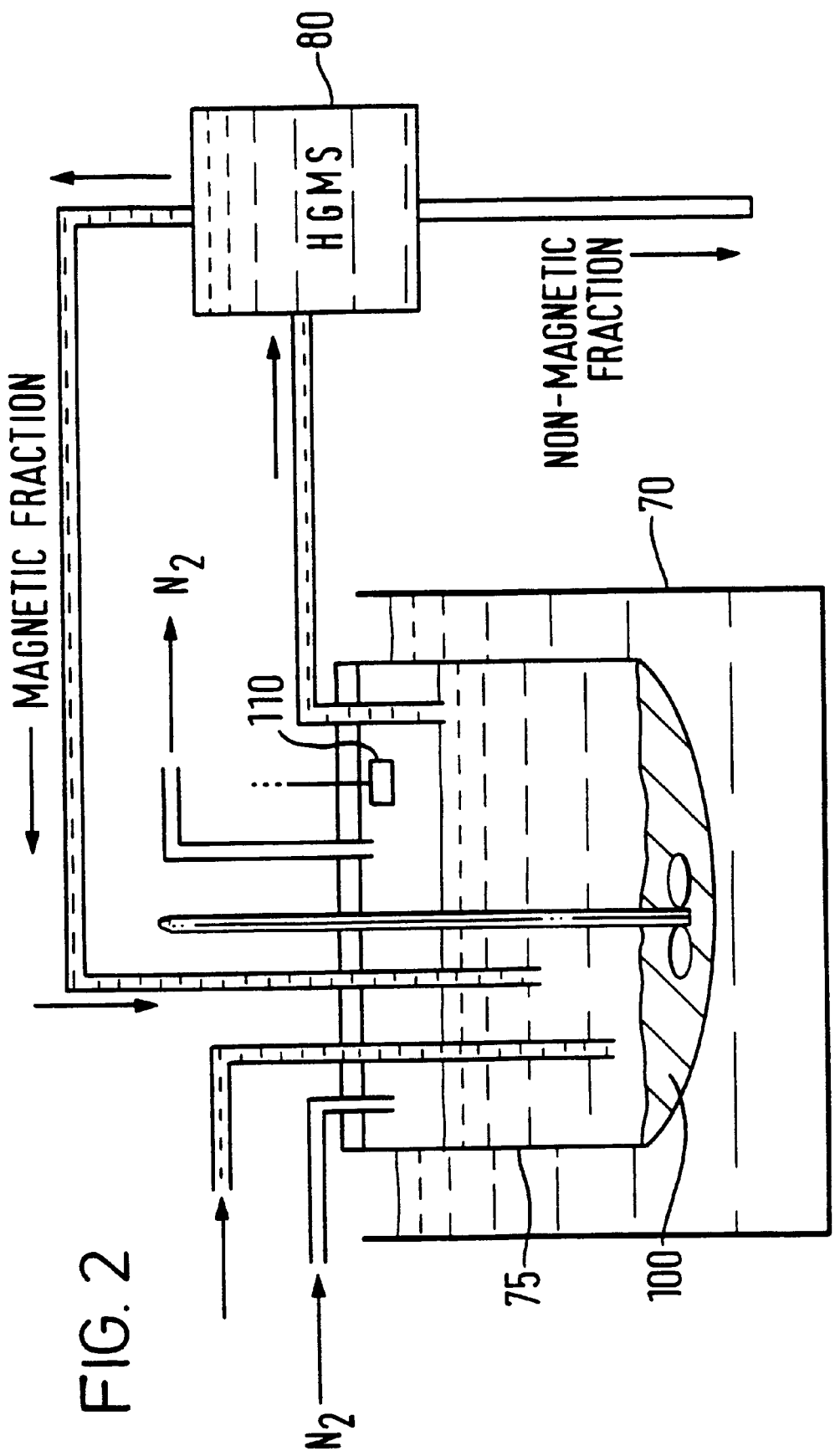
FIG. 2 is a schematic diagram of a magnetic feedback chemostat.
Figure 3A:
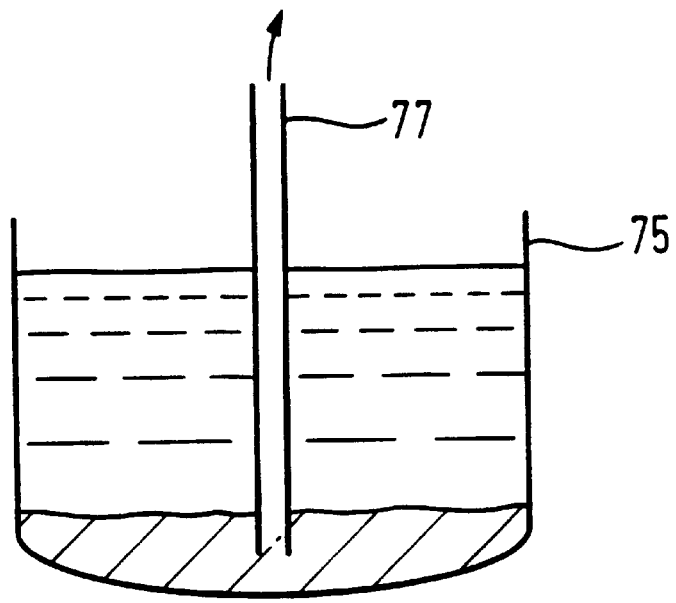
Figure 3B:
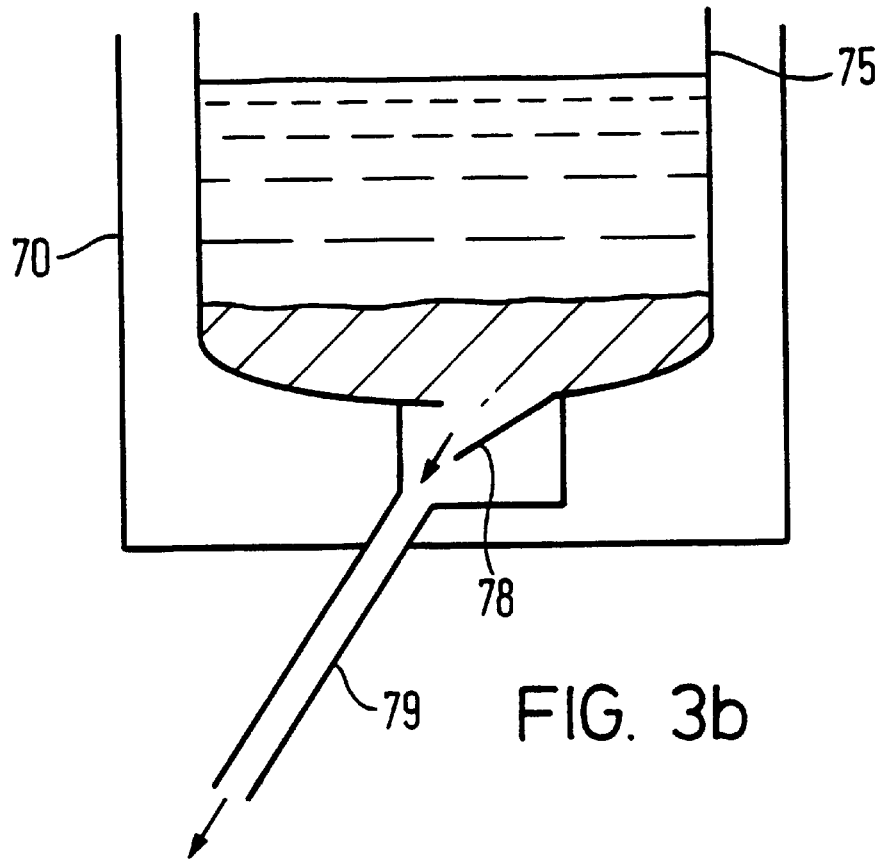

FIGS. 3a and 3b schematically illustrate techniques for recovering an adsorbent slurry from the chemostat of FIG. 2.

Referring now to FIG. 2, an influent liquid comprising a contaminated solution of heavy metals is supplied at a dilution rate of 0.1 (10%) per hour to a temperature-controlled water bath 70 of the chemostat vessel 75 containing a mixture or cocktail of micro-organisms, iron, sulphates, and a suitable nutrient compound.

An example list of sulphide-generating micro-organisms which could be included in the cocktail is as follows:

Desulfovibrio

Desulfatomaculum

Desulfomonas

Desulfobulbus

Desulfococcus

Desulfobacterium

Desulfobacter

In the temperature-controlled water bath, the micro-organism particles multiply. Some of the micro-organisms of the cocktail will tend to attach to the heavy metal contaminants, while others will not attach to the particular contaminants present.

Nitrogen gas is also supplied to assist the multiplication of the micro-organisms.

Liquid is drawn off from the temperature-controlled water bath to a high gradient magnetic separator 80 which separates a magnetic fraction from a non-magnetic fraction. The non-magnetic fraction contains decontaminated liquid and any unwanted micro-organisms (i.e. micro-organisms which do not form a magnetic product with the current contaminants), and is diverted away.

However, during a washing phase of the HGMS 80, the magnetic fraction is returned to the bath 70. This contains the magnetic product formed by interaction of certain of the micro-organisms and the contaminants. (It is not necessary to identify which particular micro-organisms are promoted in this way; the only thing that matters is that they form the magnetic product).

In this way, one or more suitable micro-organisms, which combine with the contaminants to generate a magnetic product, are promoted in the chemostat vessel. Once this population has been identified, the population can be prepared and marketed as a micro-biological product to treat that particular effluent. However, in a further stage, it has been recognised that the magnetic product generated in the feedback chemostat by such a process is itself an adsorbent of the contaminants in the liquid to be treated.

The magnetic product which is returned to the chemostat forms a slurry layer 100 at the bottom of the chemostat. This slurry tends to be formed of micro-organisms (which may well be dead by this stage) on which, for example, sulphur products of iron and sulphur products of the contaminants were precipitated. These (generally dead) micro-organisms are themselves useful as electrostatically or chemically bonded adsorbents of the contaminants, as is the material precipitated on the micro-organisms, even if it becomes detached from the micro-organisms. Accordingly, the slurry which collects at the bottom of the feedback chemostat can be removed and used in the magnetic treatment of further contaminated liquid in a conventional chemostat arrangement, by mixing the adsorbent slurry with the liquid to be decontaminated and then incubating the mixture, typically for several hours.

Various modifications of the basic process described above are envisaged in further embodiments of the invention.

The magnetic susceptibility of the adsorbent can be increased by adding erbium and/or dysprosium ions (as erbium or dysprosium salts such as chlorides or ethylene diamine tetra acetates (EDTAs)) either during the feedback process described above or at the end of the process when the slurry is recovered.

The example above referred to the production of sulphides of iron. However, other metals such as, mercury could be used, and sulphates as well as (or instead of) sulphides could be produced. Furthermore, instead of producing sulphides using the Desulfovibrio or other sulphide-generating micro-organism, other products such as phosphates and/or oxides could be produced by using micro-organisms appropriate to those salts such as Candida Utilis or Metalo Reducians respectively. The performance of the adsorbent slurry produced with these alternative salts can be enhanced by adding erbium and/or dysprosium as described above.

The techniques described above are not only suitable for use in recovering heavy metal contaminants; they can also be used for removing organic contaminants such as chloro- and fluoro-carbon compounds. This is particularly true for adsorbent products based on sulphides.

Although the apparatus described above allows the adsorbent product to be collected as a slurry from the bottom of the vessel, it could instead be collected by techniques such as froth flotation (described in the reference "Mineral Processing Technology", 3rd Edition, B A Wills, Pergamon Press, 1985); membrane filtering, high speed centrifugal filtering or hydroclone techniques.

Finally, it has been observed that a possible by-product of the process is hydrogen sulphide ($H_2S$) which can be produced if excess sulphate ions are present in the reaction vessel. Hydrogen sulphide can tend to act as a precipitant of the contaminant, but is a much less efficient adsorbent than the iron sulphide products attached to the micro-organisms. It is therefore preferable to reduce the hydrogen sulphide production in order to maximise or at least improve production of the microbiological sulphides.

Hydrogen sulphide production could be reduced by simply adding large excess amounts of iron to the vessel, to eliminate any free sulphur in the vessel. However, to do this in an uncontrolled manner can increase the operating costs of the apparatus (since unnecessary amounts of iron are being added) and can have other disadvantages in that a large excess of iron would affect the molar ration of the iron-sulphur products $Fe_xS$ which are generated, which in turn can affect the adsorption efficiency.

Therefore, in an embodiment of the invention, the production rate of hydrogen sulphide is monitored by sampling the gas present above the liquid surface using a conventional electronic hydrogen sulphide detection element 110. Iron is then added to the chemostat at a rate which is controlled using conventional feedback techniques (not shown), to aim to keep the hydrogen sulphide production below a threshold amount.

FIGS. 3a and 3b illustrate two techniques for retrieving the adsorbent material 100 from the vessel 75. In FIG. 3a, a dip tube 77 is used in a collection phase to pump the material from the bottom of the vessel 75 (i.e. the material which was deposited earliest). In FIG. 3b, a trap-door or similar opening 78 is provided at or near the lowest point of the vessel 75 (with a passageway 79 provided through the water bath 70) to allow the earliest-deposited material to be retrieved.

In summary, embodiments of the invention relate to the production of microbiological populations which, for industrial effluents, can produce magnetic adsorbent material. For different effluents there may be different populations of micro-organisms produced.

What is claimed is:

1. Apparatus for generating an adsorbent product for use in magnetic separation of contaminants from an influent liquid containing the contaminants, the apparatus comprising:

a chemostat vessel for growing micro-organisms and operable to mix the micro-organisms with the influent liquid containing the contaminants;

a magnetic separator connected to receive liquid from the chemostat vessel, operable to separate a magnetic fraction of the liquid from a non-magnetic fraction, and connected to return the magnetic fraction from the magnetic separator to the chemostat vessel;

a detector arranged to detect a rate of hydrogen sulphide production within the chemostat vessel; and means operable to add iron to the chemostat vessel in amounts dependent on the rate of the hydrogen sulphide production detected by the detector.

2. Apparatus according to claim 1, in which the chemostat vessel comprises an interior vessel supported within a temperature controlled water bath.

3. A method of generating an adsorbent product for use in bio-magnetic separation of contaminants from an influent liquid containing contaminants, the method comprising;

(i) mixing two or more types of micro-organisms with the influent liquid containing the contaminants in a chemostat vessel to allow some of the micro-organisms to attach to the contaminants to form a magnetic product;

(ii) magnetically separating a magnetic fraction of liquid containing the magnetic product from the chemostat vessel from a non-magnetic fraction;

(iii) returning the magnetic fraction to the chemostat vessel whereby those of the two or more types of micro-organisms that preferentially attach to the contaminants are promoted in the chemostat vessel; and (iv) collecting precipitated material from the chemostat vessel for use as the adsorbent product.

4. A method according to claim 3, in which (ii) and (iii) are performed cyclically a plurality of times.

5. A method according to claim 3, in which the micro-organisms include one or more micro-organisms selected from the group consisting of:

sulphide-generating micro-organisms;

sulphate-generating micro-organisms;

oxide-generating micro-organisms; and phosphate-generating micro-organisms.

6. A method according to claim 3, further comprising adding erbium and/or dysprosium ions to the chemostat vessel.

7. A method according to claim 3, in which (iv) includes collecting a slurry from the bottom of the chemostat vessel.

8. A method according to claim 3, further comprising:

monitoring a hydrogen sulphide production rate in the chemostat vessel; and adding iron to the chemostat vessel in amounts dependent on the hydrogen sulphide production rate.

* * * * *